United States Patent [19]

Lederman et al.

[11] Patent Number: 4,664,237
[45] Date of Patent: May 12, 1987

[54] OVERRUNNING ROLLER CLUTCH WITH INCREASED LOAD CAPACITY

[75] Inventors: Frederick E. Lederman, Sandusky; Albert D. Johnston, Huron, both of Ohio

[73] Assignee: General Motors Corporation, Detroit, Mich.

[21] Appl. No.: 848,578

[22] Filed: Apr. 7, 1986

[51] Int. Cl.[4] .................. F16D 15/00; F16D 41/06
[52] U.S. Cl. ........................................ 192/45; 192/44
[58] Field of Search ..................... 192/41 R-45.2

[56] References Cited

U.S. PATENT DOCUMENTS

| | | |
|---|---|---|
| 2,382,331 | 8/1945 | Peterson et al. |
| 3,064,777 | 11/1962 | Boedigheimer et al. ............. 192/45 |
| 3,087,590 | 4/1963 | Gorsky . |
| 3,119,480 | 1/1964 | Fuchs .................................. 192/44 |
| 3,537,554 | 11/1970 | Elmore . |
| 3,731,774 | 5/1973 | Kitchin ................................ 192/45 |

*Primary Examiner*—William F. Pate, III
*Assistant Examiner*—R. Chilcot
*Attorney, Agent, or Firm*—Patrick M. Griffin

[57] ABSTRACT

An overrunning roller clutch with a double row of rollers has an increased load bearing capacity, substantially equivalent to that of a clutch having a single row of rollers of double the length, but without the end loading problems that could occur from single, longer rollers. The clutch uses specially designed unitary energizing springs with resilient elements located by a base of the spring, in cooperation with the cage, so as to act independently on each roller of each pair.

3 Claims, 7 Drawing Figures

OVERRUNNING ROLLER CLUTCH WITH INCREASED LOAD CAPACITY

This invention relates to overrunning clutches in general and specifically to an overrunning roller clutch that has an increased load bearing capacity.

BACKGROUND OF THE INVENTION

Overrunning clutches, especially roller clutches, typically operate between a pair of relatively rotatable coaxial members. Overrunning clutches are used in many applications, and may operate passively so as to allow one member to rotate in only one direction relative to another, as in a torque converter. When used between two clutch races in an automatic transmission, however, such clutches operate actively, so as to transfer torque in a selected direction. In any application, however, the wedging elements of such an overrunning clutch, typically cylindrical rollers, must support a load. Such a roller clutch generally includes a cage that is located between the races and a row of rollers contained by a suitable means within the cage. The rollers wedge between the races so as to transfer torque in one direction of relative rotation, but rotate freely or overrun in the other direction. Generally, such clutches contain a single row of rollers, and their load bearing capacity is proportional to their length. Where it is desired to increase the load bearing capacity, it is known to place two overrunning clutches side-by-side, as in the U.S. Pat. No. 3,087,590 to Gorsky, assigned to the assignee of the present invention. An example of a single overrunning clutch having a double row of rollers may be found in the U.S. Pat. No. 2,382,331 to Peterson et al. The clutch disclosed there, however, is of the type that has to be externally shifted in order to transmit torque in a selected direction. Such a design is not useful in an environment like an automatic transmission where the rollers must be continually energized so as to automatically react in the selected direction desired.

SUMMARY OF THE INVENTION

The subject invention provides an overrunning roller clutch that has a double row of rollers, and therefore an increased load bearing capacity, but is of the automatically acting type having energizing springs. Two embodiments are disclosed. The clutch of the invention transfers torque between a pair of relatively rotatable coaxial members, which are an inner and outer clutch race. The inner race has a plurality of circumferentially spaced sloped cam ramps and the outer race has a cylindrical race confronting the cam ramps. Although the clutch of the invention has substantially the capacity of a clutch with a single row of rollers of equivalent length, it does not create the problems of roller end loading that could occur from axial misalignment with such a single, longer roller, row.

The roller clutch of the invention includes a cage adapted to be placed between the clutch races. The cage has a pair of axially spaced side rails and a plurality of support members in the form of cross rails connecting the side rails, thereby defining a plurality of pockets. Each of the pockets contains a pair of cylindrical rollers located in side-by-side relation between the side rails and spaced from a respective cross rail. An energizing spring is contained in each cage pocket, located in the space between each pair of rollers and respective cross rail. Each spring is formed with a base and a pair of resilient elements that are joined to the base in a particular manner. Therefore, the spring is as easily handled and as easily installed in the pocket as a conventional unitary spring. The base is sized so that when the cage is in place the spring will self locate relative to the cage, in cooperation with the cage side rails and cross rail.

When the cage is in place between the races, each roller of each pair is circumferentially limited by its engagement between the surface of a respective cam ramp of the inner clutch race and the confronting cylindrical surface of the outer clutch race. In the embodiments disclosed, the width of the base of the spring is substantially equal to the spacing of the cage side rails. Therefore, the spring will self locate with the base against the cross rail and closely confined between the cage side rails, and with each resilient element biased against a respective roller of each roller pair. In addition, the resilient elements are joined to the base in such a way that the base also maintains the resilient elements physically separated. In the embodiments disclosed, this is done by stamping the resilient elements integrally with the base, and spaced apart sufficiently to keep them physically separated. Each resilient element may therefore independently energize its respective roller to a position of light engagement between the cam ramp and confronting cylindrical surface when the races rotate in one relative direction, ready to automatically wedge between the races when the relative direction of rotation changes. Thus, the single spring acts essentially as would two independent springs. In addition, in one of the embodiments disclosed, the separation of the resilient elements on the base is also sufficiently less than the spacing of the side rails such that the spring can also self-align relative to the cage. The spring base maintains the resilient elements spaced away from the side rails, as well as physically spaced apart from one another, thus preventing the side rails from interfering with the independent action of the springs.

It is, therefore, a broad object of the invention to provide an automatically acting overrunning roller clutch that operates between a pair of relatively rotatable coaxial members and which has a double row of rollers, and thus an increased load bearing capacity.

It is another object of the invention to provide such an overrunning clutch that has a cage with a pair of axially spaced side rails and a support member extending into the axial space, and which also has a pair of rollers located between the side rails in side by side relation and spaced from the support member, and which also has an energizing spring located in the space between the rollers and the support member and having a base and a pair of separate resilient elements joined to the base, and in which the base is sized such that, when the cage is in place, the spring will self locate relative to the cage in cooperation with the cage side rails and support member with each resilient element biased against a respective roller, and in which the resilient elements are also joined to the base such that it maintains the resilient elements physically separated so that each resilient element may independently energize on its respective roller to a position ready to be wedged between the rotatable members.

It is yet another object of the invention to provide a roller clutch of the type described in which the resilient elements are joined to spring base at locations spaced apart sufficiently great that the base maintains the resilient elements physically separated so that each resilient element may independently energize its respective roller.

It is still another object of the invention to provide an overrunning roller clutch of the type described in which the distance that the resilient elements are spaced apart on the spring base is also sufficiently less than the spacing of the cage side rails that the spring will also self align relative to the cage with the resilient elements spaced away from the cage side rails.

DESCRIPTION OF THE PREFERRED EMBODIMENT

These and other objects and features of the subject invention will appear from the following written description and drawings, in which:

FIG. 1 shows a portion of a pair of coaxial clutch races with a corresponding portion of the overrunning roller of the invention in place;

FIG. 2 is a view of a portion of the clutch of the invention before it is placed between the clutch races;

FIG. 3 is a view taken along the line 3—3 of FIG. 1 and showing one pocket in detail;

FIG. 4 is a view similar to FIG. 3, but showing an alternative embodiment of the energizing spring;

Figure 4:
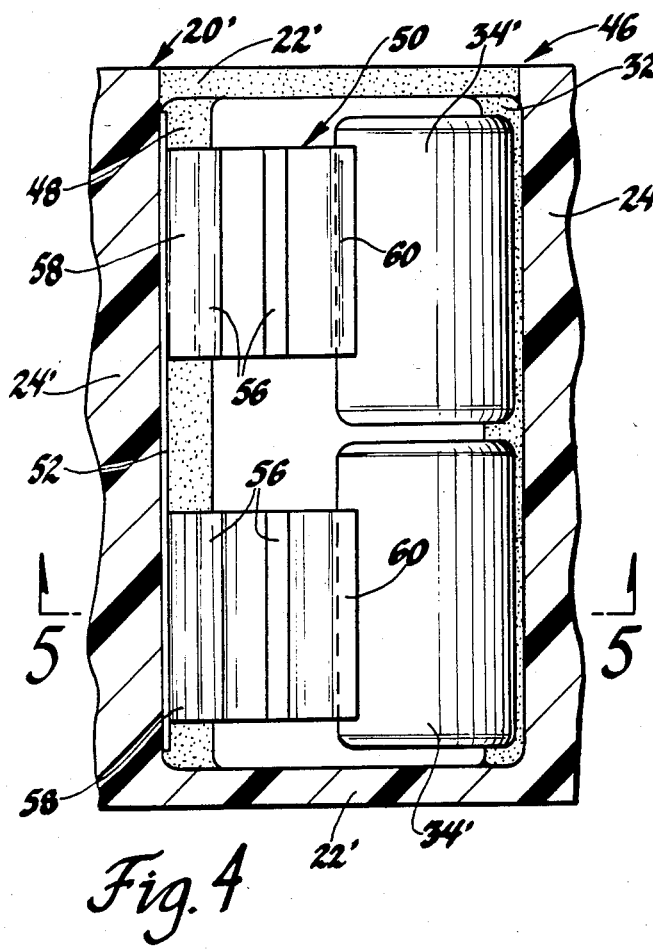
FIGS. 4 through 6 show a second embodiment of the invention.
Figure 5:
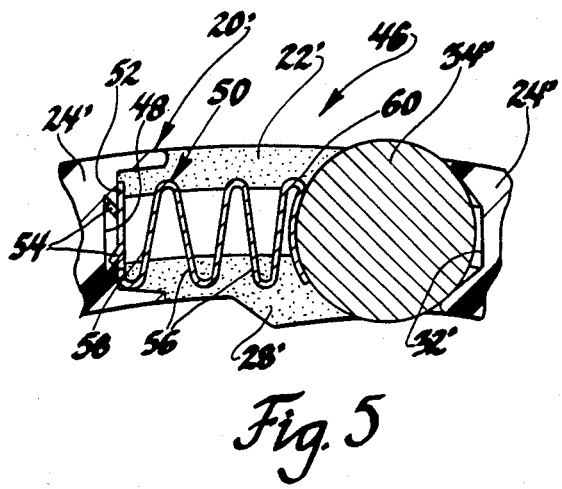
Figure 6:
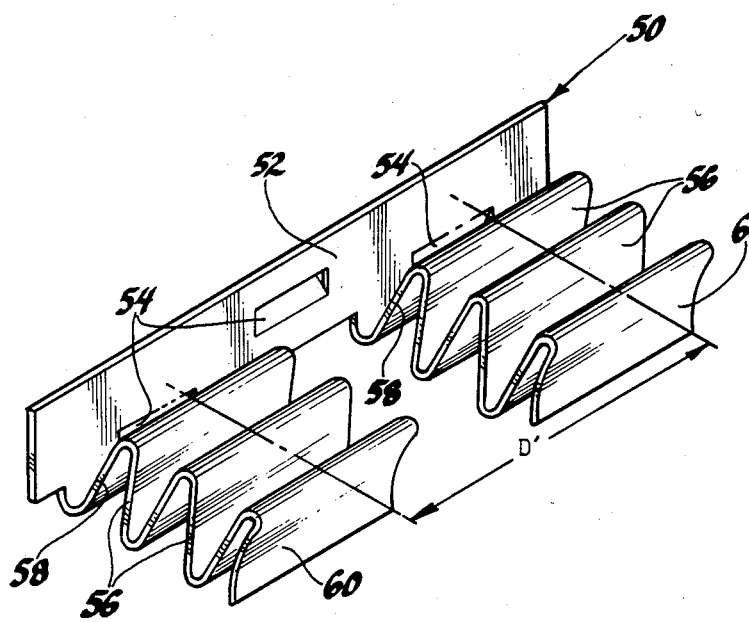
Figure 7:
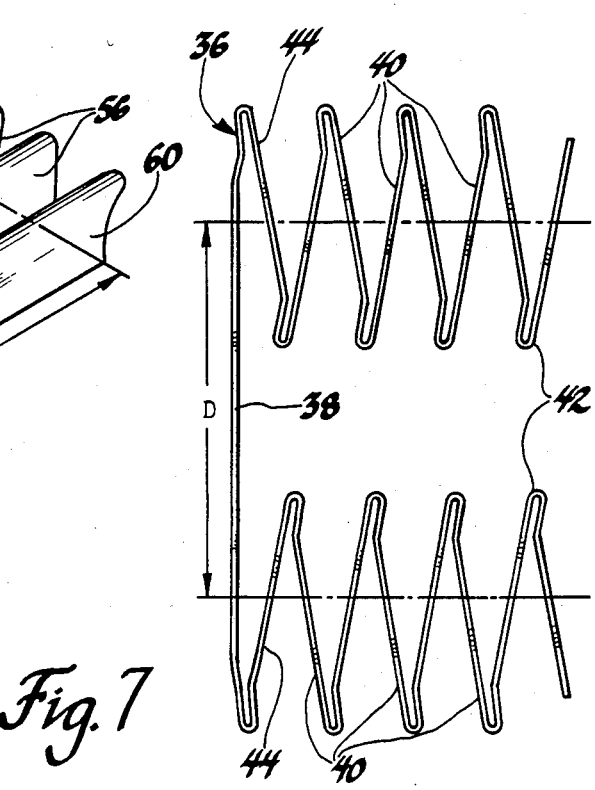

FIG. 5 a view taken along the line 5—5 of FIG. 4;

FIG. 6 is a perspective view of single energizing spring of the second embodiment;

FIG. 7 is a plan view of a single energizing spring of the first embodiment.

Figure 1:
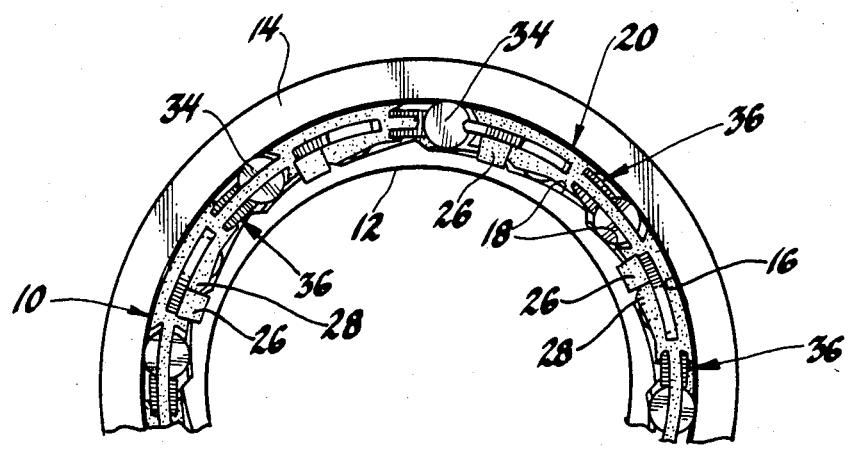
FIGS. 1 through 3 show a first embodiment of the invention.

Referring first to FIG. 1, a first embodiment of the overrunning roller clutch of the invention is designated generally at 10. Each embodiment of the clutch disclosed is intended for use in an automatic transmission, and automatically transfers torque in a selected direction between inner and outer relatively rotatable and coaxial clutch races 12 and 14. The outer clutch race 14 has a cylindrical surface 16 while the inner clutch race 12 has a generally cylindrical surface comprised of a plurality of cam ramps 18 that confront the cylindrical surface 16, forming a generally annular space. The clutch 10 is adapted to be placed in that annular space, as will be further described below. The clutch 10 operates such that the inner race 12 can transfer torque to the outer race 14 by turning relative to it in the counterclockwise direction, but will overrun if it turns relative to it in the clockwise direction. The opposite will be true for the outer race 14 transferring torque to the inner race 12. This basic operation is typical for overrunning roller clutches.

Figure 2:
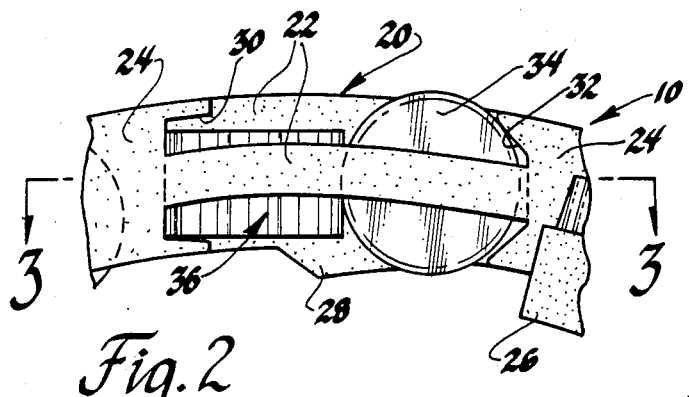
Figure 3:
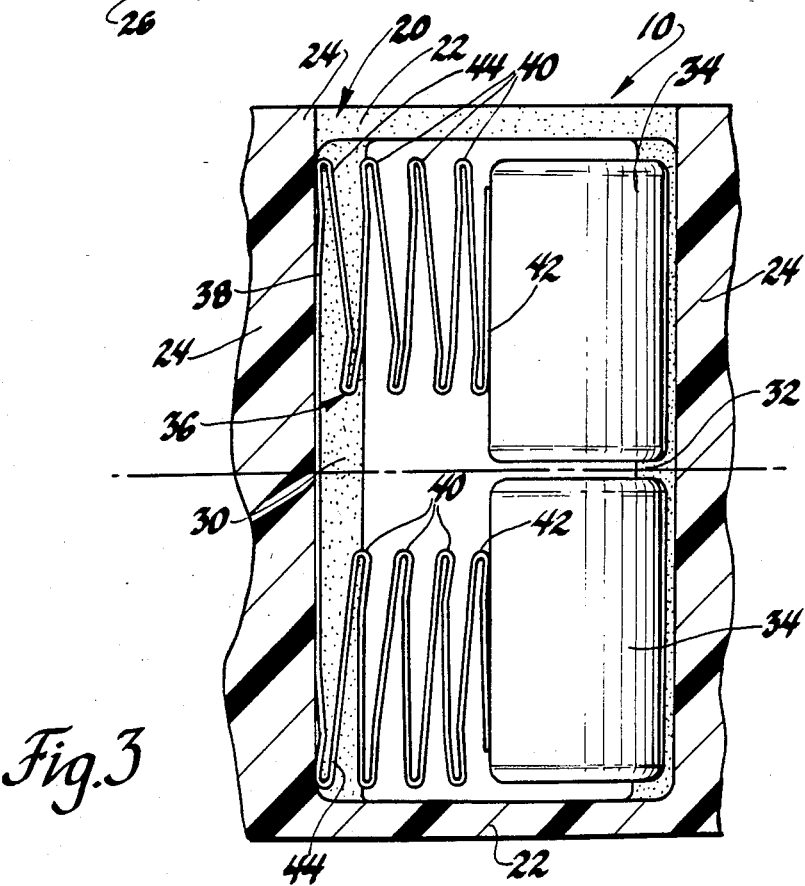

Referring now to FIGS. 1, 2 and 3, details of the construction of the first embodiment of the invention 10 may be seen. A cage, designated generally at 20, is molded from nylon or other suitable material. As may be best seen in FIG. 3, the basic structure of cage 20 includes a pair of axially spaced side rails 22 that are interconnected by a plurality of evenly circumferentially spaced cross bars, designated generally at 24. The side rails 22 and cross bars 24 together define a plurality of pockets, one respective to each cam ramp 18. As best seen in FIG. 2, each side rail 22 is made up of alternating double and single circumferentially extending segments. This is due to the manner in which the cage 20 is molded, by a single pair of mold elements that pull straight apart. The cage side rails 22 could each be molded as a single, wider member, if a different molding method were used. In addition, cage 20 is molded with a plurality of stop ears 26 and sloped cam supports 28.

As best seen in FIG. 1, each cam support 28 rests on a respective cam ramp 18 when the clutch 10 is placed in the annular space between the races 12 and 14. This assures that cage 20 rotates with inner race 12. Stop ears 26 engage one face of inner race 12 to locate cage 20 in one axial direction. Finally, as may be best seen in FIG. 2, each cross bar 24 includes a slot 30 on one side facing in one circumferential direction and an indent 32 on the other side facing in the other circumferential direction. As best seen in FIG. 3, a pair of cylindrical rollers 34 is contained in each pocket. The operation of rollers 34 will be described in detail below. However, it may be understood at this point that the load bearing capacity, or torque transferring capacity, of a clutch is generally proportional to the length of its rollers. Theoretically, therefor, a single row of rollers twice as long as the rollers 34 would have roughly the same capacity. However, a certain amount of axial misalignment is possible between the races 12 and 14. Were it attempted, therefore, to use a single row of rollers of that double length, the end loading caused on the longer rollers by the axial misalignment could be a problem. The invention avoids the end loading problem, since it provides a double row of rollers, but does so with a structure that is as convenient as a conventional, automatically acting clutch, with a single row of rollers.

Referring now to FIGS. 3 and 7, the rollers 34 of each pair are located side-by-side between the side rails 22 and circumferentially spaced from a respective cross bar 24. Rollers 34 are sized so as to fill most of the axial space side rails 22, but with enough clearance that they do not rub on each other or on the inside of the side rails 22. When the cage 20 is in place, each roller 34 of each pair is circumferentially limited in the clockwise direction by its engagement between the surface of a respective cam ramp 18 of the inner clutch race 12 and the confronting cylindrical surface 16 of the outer clutch race 14. An energizing spring designated generally at 36 is located in each pocket, in the space between each pair of rollers 34 and respective cross bar 24. Each spring 36 includes a generally flat base 38 and a pair of resilient elements made up of three generally axially extending live folds or loops 40, an end dead loop 42, and a bottom dead loop 44 integral with base 38. The resilient elements thus comprised extend generally normal to base 38 and parallel to each other. Base 38 has a width substantially equal to the spacing of the side rails 22.

Referring now to FIG. 3, it may be seen how base 38 allows the spring 36 to self-locate relative to the cage 20 in cooperation with the cage side rails 22 and the cross bar 24. When spring 36 is in the pocket, the base 38, because of its width, will seat itself against the cross bar 24, which thereby provides a support member, and will also be closely confined between the inner surfaces of the side rails 22. Specifically, in the embodiment disclosed, the base 38 will seat itself in the slot 30. Each end dead loop 42 will be biased against a respective roller 34, which is thereby energized to a position of lightly touching engagement between a cam ramp 18 and the confronting surface 16. In that position, each roller 34 is ready to be automatically wedged between the races 12 and 14 in response to a change in the direction of relative rotation therebetween. Because the spring 36 is unitary, it is as convenient to handle as a typical spring in a conventional, single row clutch.

However, because of the way the resilient elements are joined to the base 38, they can act independently, similarly to two separate springs. Referring again to FIG. 7, this may be understood in terms of the dotted lines, which represent the lines of action of the resilient elements. They are spaced apart a distance designated "D" which is sufficiently great to prevent the innermost folds of the loops 40, 42 and 44 from contacting one another, thus assuring the physical separation of the resilient elements. Thus, each roller 34 may be independently acted upon and energized by the single energizing spring 36. The ready position need not be the same for each roller 34, because of the independent action allowed. In addition, as may be seen in FIG. 2, before the cage 20 is located in place, the spring 36 pushes each roller 34 into the indent 32 to keep them with the cage for shipping purposes. The spring base 38 also cooperates to provide another function, which is best illustrated in the second embodiment, described next.

Referring next to FIGS. 4 through 6, a second embodiment of the roller clutch of the invention is designated generally at 46. It will be understood that the second embodiment 46 is adapted to be located between similar races and transfers torque in a similar way. Those elements that are the same or very similar are given the same number with a prime ('). The second embodiment 46 also includes a cage 20' having axially spaced side rails 22', cross bars 24' and side-by-side cylindrical rollers 34'. The cross bar 24' has a similar indent 32', but has a different dovetail shaped slot 48, best seen in FIG. 5.

The main difference in the second embodiment 46 lies in its energizing spring, best seen in FIG. 6 and designated generally at 50. Spring 50 has a generally flat base 52 in which oppositely directed tabs 54 are lanced. The tabs 54 fit within the slot 48 to help hold the spring 50 to the cage 20' during shipping, as seen in FIG. 5. In addition, the rollers 34' are also maintained pushed into the indents 32' by the force of the spring 50, just as with the first embodiment of the clutch 10. Spring 50 also includes a pair of resilient elements, each made up of a pair of generally radially extending live loops 56, a bottom dead loop 58 integrally joined to base 52, and an end dead loop 60 stamped with a curvature that roughly matches roller 34'. Just as with the spring 36, the base 52 also has a width substantially equal to the axial separation of the side rails 22'. The spring 50 will, therefore, similarly self-locate relative to the cage 20' when the cage is in place, with each end dead loop 60 biased against a roller 34 to energize it to a ready position. The separation D' of the resilient elements is sufficient to keep the inboard sides of the loops 56, 58 and 60 physically separated so that the resilient elements they comprise may act independently on the rollers 34'. In addition, however, the distance D' is sufficiently less than the axial spacing of the cage side rails 22' that the spring 50 will also self-align. That is, the base 52 will maintain the outside edges of the loops 56, 58 and 60 spaced away from the inside of the cage side rails 22', so that the independent action of the resilient elements will not be compromised.

It will be understood that the self-aligning feature of the spring 50 may also be incorporated in the spring 36, although it is more easily illustrated for the spring 50. In addition, springs of other configurations may be used, so long as the sizes of their bases and the manner in which the resilient elements are joined to the bases are similar. Any spring so constructed will be self-locating and self-aligning, and the independent action of the resilient elements will be assured. Therefore, it will be understood that the invention is capable of being embodied in structure other than those disclosed, and the invention is not intended to be limited thereby.

The embodiments of the invention in which an exclusive property or privilege is claimed are defined as follows:

1. An overrunning roller clutch of the type that operates between a pair of relatively rotatable coaxial members, said clutch having an increased load bearing capacity, comprising, a cage adapted to be placed between said members and having a pair of axially spaced side rails and a support member extending into said axial space, a pair of rollers located between said side rails in side by side relation and spaced from said support member, and, an energizing spring located in the space between said rollers and said support member and having a base and a pair of separate resilient elements joined to said base, said base being sized such that, when said cage is in place, said spring will self locate relative to said cage in cooperation with said cage side rails and support member with each resilient element biased against a respective roller, said resilient elements also being joined to said base such that it maintains said resilient elements physically separated so that each resilient element may independently energize on its respective roller to a position ready to be wedged between said rotatable members, said independently acting roller pair having a load bearing capacity substantially equal to a single roller of equivalent length.

2. An overrunning roller clutch of the type that operates between a pair of relatively rotatable coaxial members, said clutch having an increased load bearing capacity, comprising, a cage adapted to be placed between said members and having a pair of axially spaced side rails and a support member extending into said axial space, a pair of rollers located between said side rails in side by side relation and spaced from said support member, and, an energizing spring located in the space between said rollers and said support member and having a base and a pair of separate resilient elements joined to said base at spaced apart locations, said base having a width substantially equal to the spacing of said cage side rails, whereby, when said cage is in place, said spring will self locate relative to said cage with said spring base against said support member and closely confined between said cage side rails and with each resilient element biased against a respective roller, said resilient elements being spaced apart on said base a distance sufficiently great that said base maintains said resilient elements physically separated so that each resilient element may independently energize its respective roller to a position ready to be wedged between said rotatable members, said independently acting roller pair having a load bearing capacity substantially equal to a single roller of equivalent length.

3. An overrunning roller clutch of the type that operates between a pair of relatively rotatable coaxial members, said clutch having an increased load bearing capacity, comprising, a cage adapted to be placed between said members and having a pair of axially spaced side rails and a support member extending into said axial space, a pair of rollers located between said side rails in side by side relation and spaced from said support member, and, an energizing spring located in the space between said rollers and said support member and having a base and a pair of separate resilient elements joined to said base at spaced apart locations, said base having a width substantially equal to the spacing of said cage side rails, whereby, when said cage is in place, said spring will self locate relative to said cage with said spring base against said support member and closely confined between said cage side rails and with each resilient element biased against a respective roller, said resilient elements being spaced apart a distance on said base sufficiently great that said base also maintains said resilient elements physically separated so that each resilient element may independently energize its respective roller to a position ready to be wedged between said rotatable members, said distance also being sufficiently less than the spacing of said cage side rails that said spring will also self align relative to said cage with said resilient elements spaced away from said cage side rails, said independently acting roller pair having a load bearing capacity substantially equal to a single roller of equivalent length.

* * * * *